United States Patent [19]

Toulmay et al.

[11] Patent Number: 5,332,362
[45] Date of Patent: Jul. 26, 1994

[54] BLADE FOR AIRCRAFT ROTARY WINGS, WITH SWEPT-BACK TIP

[75] Inventors: Francois V. Toulmay, Vitrolles; Danièle A. Falchero, Ventabren, both of France

[73] Assignee: Societe Anonyme dite: Eurocopter France, Marseille, France

[21] Appl. No.: 36,498

[22] Filed: Mar. 24, 1993

[30] Foreign Application Priority Data

Apr. 9, 1992 [FR] France .............. 92 04353

[51] Int. Cl.⁵ ............................. B64C 11/18
[52] U.S. Cl. ...................... 416/223 R; 416/228; 416/238; 416/DIG. 5
[58] Field of Search ............. 415/223 R, 238, 228, 415/DIG. 2, DIG. 5

[56] References Cited

U.S. PATENT DOCUMENTS

| | | |
|---|---|---|
| 3,066,742 | 12/1962 | Castles, Jr. |
| 3,721,507 | 3/1973 | Monteleone ............ 416/223 R |
| 3,728,045 | 4/1973 | Balch ..................... 416/223 R |
| 4,392,781 | 7/1983 | Mouille et al. ......... 416/223 R |
| 4,652,213 | 3/1987 | Thibert et al. ......... 416/DIG. 2 |
| 4,880,355 | 11/1989 | Vuillet et al. .......... 416/228 |
| 5,035,577 | 7/1991 | Damongeot ............ 416/223 R |
| 5,137,427 | 8/1992 | Shenoy ................... 416/DIG. 2 |
| 5,174,721 | 12/1992 | Brocklehurst ......... 416/223 R |

FOREIGN PATENT DOCUMENTS

| | | |
|---|---|---|
| 298826A1 | 1/1989 | European Pat. Off. . |
| 351104A2 | 1/1990 | European Pat. Off. . |
| 360661A1 | 3/1990 | European Pat. Off. . |
| 6167 | of 1911 | United Kingdom ........ 416/DIG. 2 |

Primary Examiner—John T. Kwon
Attorney, Agent, or Firm—Marshall, O'Toole, Gerstein, Murray & Borun

[57] ABSTRACT

The variation in the length of the chord L and the variation of the offset Y'f of the aerodynamic center are such that the leading edge (5) and the trailing edge (6) of the blade (1), along its longitudinal extent, exhibit no break, the overall aerodynamic center of said blade Being substantially situated on the pitch variation axis.

12 Claims, 7 Drawing Sheets

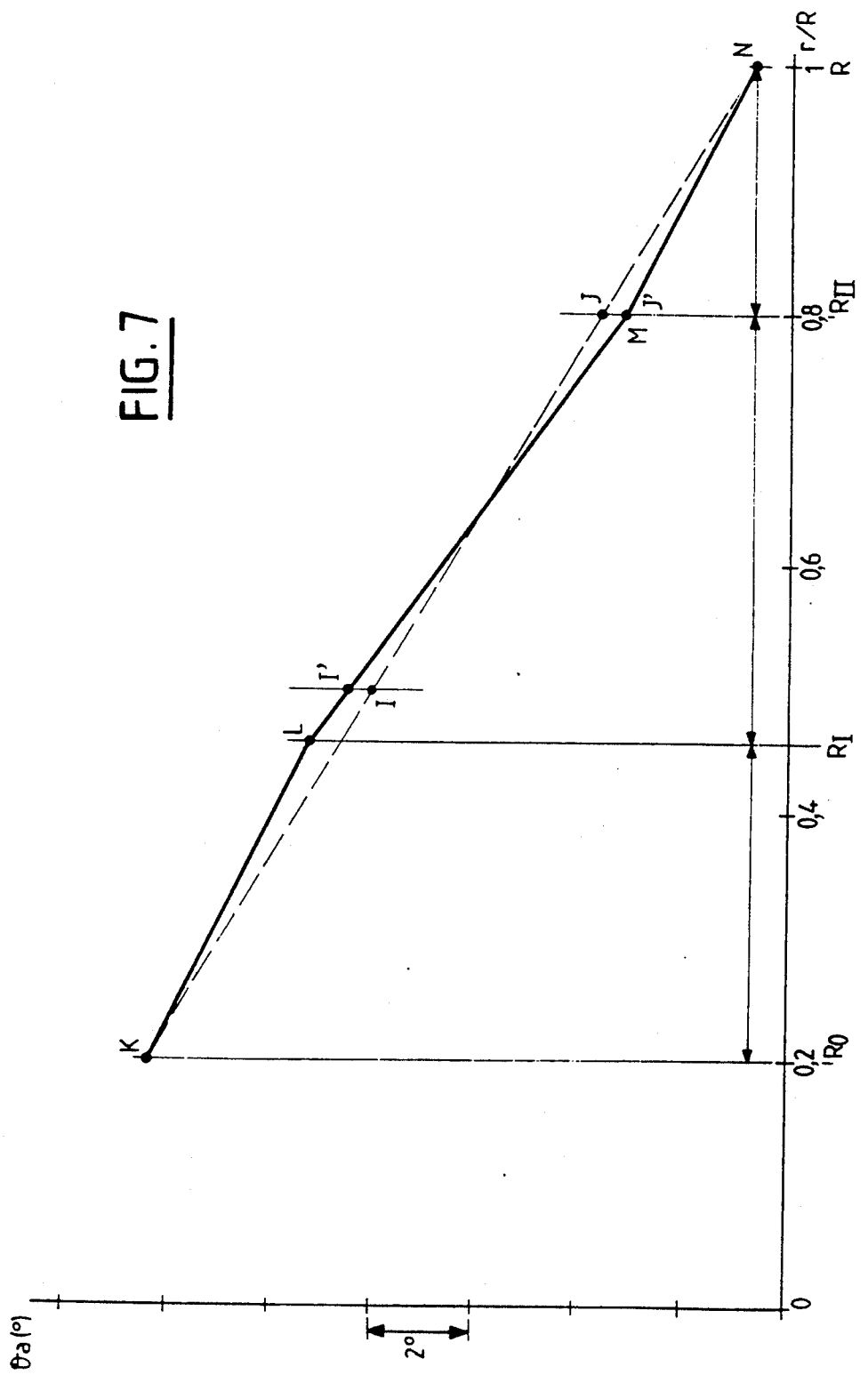

BLADE FOR AIRCRAFT ROTARY WINGS, WITH SWEPT-BACK TIP

The present invention relates to a blade for aircraft rotary wings, with a swept-back tip.

It is known that, both in hovering flight and in forward flight, the performance of a rotary wing aircraft rotor, especially a helicopter, is limited by the following phenomena:

the shock waves which develop on the upper surface of the blades in advancing position during flight at high speed;

the stall resulting from the separation of the boundary layer at the upper surface of the blades in retreating position, during a demand for lift in translation flight;

the interaction of the vortex generated by the preceding blade With the following blade, which gives rise to a significant dissipation of energy in hovering flight in two forms: induced power and profile drag power.

In addition to the losses of performance, the shocks and the blade-vortex interaction are also responsible for audible nuisances in the form of impulse noise, respectively by delocalization of the shocks (flight at high speed) and by pulse modulation of the lift when the marginal vortex directly strikes the blade (descent).

It has been found that the performance of a blade for aircraft rotary wings depended, to a large extent, on parameters linked to the construction of the blade, such as:

a) the radial distribution of the surface area of the blade;
b) the sweeping-back of the free tip part of the blade;
c) the distribution of the twisting of the profiles;
d) the dihedral shaping of the free tip part of the blade.

The influence of these parameters on the performance of a rotary wing blade is studied in detail below.

a) Radial distribution of the surface area of the blade.

For a rotary wing aircraft rotor whose profiles or elementary sections all work at the same lift coefficient $Cz$, the lift per unit length varies as the square of the local speed, which is directly proportional to the radius (radial position) E of the section. This results in the total lift of the blade varying proportionally with the mean chord L, defined by a weighting of the square of the radius r:

$$\overline{L} = \frac{\int_{R0}^{R} L(r) r^2 dr}{\int_{R0}^{R} r^2 dr}$$

in which R0 represents the radius E at the origin of the aerodynamic part of the blade, and R the total radius of the blade.

It is current practice to compare the performance of blades of different shapes by referring them to this mean chord $\overline{L}$.

With respect to a conventional blade of rectangular shape, calculations show, and experience confirms, that a reduction in the chord at the outer end of the blade (tapered shape) improves performance, in particular at high speed. This improvement in performance is explained by the reduction in drag of the profiles due to the reduction of the chord at the tip. The shocks situated in this area are exerted on a smaller surface, while the central part of the blade, not subjected to the shocks, then essentially provides the lift with maximum aerodynamic efficiency: the lift/drag quotient there is at a maximum.

The increase in the chord over the rest of the span of the blade, necessary to maintain the mean chord constant, is, however, significant, due to the fact of the weighting by $r^2$. This results in a significantly heavier rotor. Nevertheless, tapering towards the outside of the blade is a means currently used to improve the performance of the latter, in general in combination with sweeping-back of the tip of the blade, as the Patents FR-2 617 118 and FR-2 473 983 illustrate.

Moreover, the Patent FR-2 311 713 proposes a very different construction, which consists, among other features, in widening the chord, sharply, beyond a section situated at about 87% of the total radius of the blade R. This arrangement contributes to the appearance of intense and stable vortices which push back the stall limit, in particular when the blade is in retreating position. However, this concept, which concentrates the blade surface towards its tip, amounts to reducing the effective part of the rotor to a peripheral ring. This makes the flow induced less uniform, and, consequently, the power induced increases, which is particularly troublesome on take-off.

b) Sweeping-back of the free tip part of the blade.

Moreover, in order to defer the threshold at which shock waves appear and to limit their intensity, it is advantageous to curve the free tip of the blade rearward. The sweep angle $\Delta$, defined by the line of the aerodynamic centers (approximately at the front quarter of the chord) and the pitch variation axis, reduces the effective Mach number, and, hence, the sweeping-back of the free tip of the blade constitutes an effective means for reducing the unfavorable consequences of compressibility of the air, especially the appearance of shock waves. Such sweeping-back of the tip of the blade is illustrated especially by Patents FR-2 311 713, FR-2 473 983 and FR-2 617 118, and is used effectively on certain helicopters.

However, the amplitude of the sweep back angle and the extent in span of the tip area concerned are in fact limited by the torsion forces which result from the rearward offset of the aerodynamic lift, as well as of the center of gravity.

In the Patent FR-2 311 713, it is proposed to offset a part of the blade forward so as to balance the rearward offset of its tip. This makes it possible to extend the swept-back area over a more substantial part of the wing span. However, the connection of the portion of the leading edge offset forward with the inner part of the blade is done sharply, and the vortex generated by this connection gives rise to premature stalling of the profiles closest to the hub of the rotor. At high speed, the concave shape of the lifting edge in the region of the connection focusses and locally reinforces the shock waves, which risks reducing, or even cancelling out, the beneficial effects of the sweepback.

In the Patent FR-2 397 328, it is also suggested to offset the leading edge forward, but for a different reason. Here it is not a question of reducing the torsion forces, but of bringing about elastic deformation of the blade, in a controlled way which is thought to be favorable.

c) Distribution of the twisting of the profiles.

In addition to the radial distribution of the chord length and the sweepback of the outer tip, the distribution of the twisting of the elementary sections of a blade also participates in the improvement of the performance of the latter. The twisting of a blade consists in causing the setting of the profiles to vary along the span of the blade, so that the outer tip of the blade has a relatively small angle of incidence to the air, and the blade root has a higher incidence angle. This makes it possible to distribute the lift more uniformly over the whole surface of the rotor and thus to reduce the power absorbed in hovering flight.

The twisting is therefore characterized by the difference in setting between the two ends of the blade. However, it is known that a sharp twist may bring the outer tip of the blade to generate lift negatively (downwards) in the advancing position when the rotary wing aircraft is moving at high speed. The performance is therefore impaired and, above all, the vibration increases greatly.

The choice of the twisting therefore results from a compromise between, on the one hand, hovering flight and low speeds which require sharp twisting, and, on the other hand, forward flight for which more moderate twisting is desirable.

For reasons of simplicity, the radial distribution of the twisting is often linear, so that the total twisting is sufficient to define the setting of all the elementary sections.

However, in order to improve performance, in Patent FR-2 636 593, it is proposed to produce a nonlinear twisting consisting in overtwisting the outer tip of the blade, for example between 85 and 100% of the total radius of the blade R. That has the effect of reducing the intensity of the marginal vortex, or even to cancel it out, for a given level of lift, so that the low-speed performance is improved and the blade/vortex interaction noises in the descent are attenuated. However, this arrangement does not make it possible to push back the limits of stall, and the gains in power decrease at high speed.

d) Dihedral shaping of the free tip part of the blade.

Conventionally, the blade are constructed so that the center of the profiles, generally defined as the point of mid-thicness at the front quarter of the chord, remains substantially situated on the pitch variation axis, along the entire wing span. Moreover, sweeping back the free tip of the blade is generally carried out by displacing the center in the plane defined, on the one hand, by the pitch variation axis and, on the other hand, by the direction of the chord of the profile in the tip area.

In the Patent FR-2 617 118, an improvement to this conventional construction is described, consisting in inscribing the line of the centers in a plane passing through the pitch variation axis, but with the line inclined with respect to the chord, so that the center of the profiles at the outer tip of the blade is situated substantially lower than the inner part of the blade. The marginal vortex generated by the outer tip of a blade is then separated from the following blade, which has the consequence of reducing the intensity of the interaction, in particular in hovering flight. This results in a distinct reduction in the power absorbed by the rotor, especially in hovering and low-speed flight.

This configuration is designated by the term "dihedrel shaping" of the end of the blade, although, in the Patent FR-2 617 118, a progressive displacement (of parabolic type) of the center is carried out, and not a simple "break".

Hence it can be seen that none of the documents above describes a blade structure which is entirely devoid of drawbacks, and the present invention, in this context, relates to a blade for rotary wings, with a swept-back tip, whose geometry is defined optimally to guarantee the best performance.

To this end, the blade with a swept-back tip for aircraft rotary wings, intended to form part of a rotor whose hub is linked to said blade, which is capable of being driven in rotation around the axis of said hub, said blade including a leading edge and a trailing edge and being formed by successive elementary transverse sections, identified by the distance separating each of them from the axis of rotation of said hub, and each exhibiting a defined chord profile and an aerodynamic center whose offset with respect to the pitch variation axis, orthogonal to each of said sections, determines the sweepback of said blade, is noteworthy, according to the invention, in that said blade being subdivided, along its longitudinal extent, into four areas, namely a first area extending from the inner edge of the blade to a first section situated between 75% and 87% of the total length of the blade, measured from the axis of rotation of the hub, a second area extending from the first section to a second section situated between 87% and 93% of the total length of the blade, a third area extending from the second section to a third section situated between 93% and 97% of the total length of the blade, and a fourth area extending from the third section to the free outer edge of the blade, the length of the chord L increases generally linearly in said first area, changes according to a cubic function in said second area, is constant in said third area, and changes according to a parabolic function in said fourth area so that the blade exhibits a double taper toward the inner and outer edges of the blade, the variation in the length of the chord being such that the leading edge and the trailing edge of the blade, along its longitudinal extent, exhibit no break, and the offset $Y'f$ of the aerodynamic center with respect to the pitch variation axis varies linearly in said first area so that the aerodynamic center is offset toward the leading edge in this area, changes according to a cubic function in said second area, varies linearly in said third area, and changes according to a parabolic function in said fourth area so that the blade exhibits a rearward sweepback, the variation in the offset of the aerodynamic center being such that the leading edge and the trailing edge of the blade, along its longitudinal extent, exhibit no break.

Hence, the variation in the length of the chord and the change in the offset of the aerodynamic center, along the longitudinal extent of the blade, are such that the leading edge of the blade includes only convex or straight-line, but not concave, parts (no point of inflection seen from above), and its trailing edge concave or straight-line, but not convex, parts (no point of inflection seen from above). This makes it possible, especially, to avoid the phenomenon of focussing of the shocks brought about by local concavity of the leading edge. Moreover, the elimination or the reduction of the shocks on the tip of the blade is obtained by a strong sweepback whose effect is amplified by a long chord length in this area.

The balancing of the aerodynamic forces around the pitch variation axis is provided by displacing the aerodynamic center forward from the pitch axis (toward the leading edge) over the whole of the inner part of the blade (first area), the variation in the length of the chord and the change in the offset in the aerodynamic center being such that the overall center of the blade is situated at least substantially on the pitch axis. This geometric arrangement allows mass balancing, the overall center of gravity being able to be placed at least substantially on the pitch axis by adding a very small passive mass, or even so such mass. The overall center and the overall center of gravity both being situated at least substantially on said axis, the torsion forces in the region of the blade root, as well as the control force (link rods, swash plates, scissors, jacks), are minimized.

The inner part of the blade (first area) which contributes little to lift, but represents an important part of the mass, is reduced by progressive reduction of the chord towards the blade root ("tapering of the root"), by as much as the strength of the available materials allows. The progressiveness of this reduction guarantees that no concentrated vortex will appear at the junction with the wider part of the blade. Such a vortex is in fact made ineffective, the limit of the stall being pushed back not by this device, but rather by the use of a special twisting law, as will be seen later.

Advantageously, the variation in the length L of the chord with respect to the mean length $\bar{L}$ of the latter lies between lower ABCD and upper EFGH limits, such that the coordinates of the points A, B, C and D are as follows:

$$A \begin{vmatrix} r/R = 0 \\ L/\bar{L} = 0.60 \end{vmatrix} B \begin{vmatrix} r/R = 0.87 \\ L/\bar{L} = 1.05 \end{vmatrix}$$

$$C \begin{vmatrix} r/R = 0.93 \\ L/\bar{L} = 1.05 \end{vmatrix} D \begin{vmatrix} r/R = 1 \\ L/\bar{L} = 0.25 \end{vmatrix}$$

the lines joining these points to form the limit ABCD being straight-line segments with the exception of the segment CD of parabolic shape defined by:

$$L(r/R)/\bar{L} = 1.05 - 0.80 \, x^2$$

with $x = (r/R - 0.93)/0.07$ and the coordinates of the points E, F, G and H are as follows:

$$E \begin{vmatrix} r/R = 0 \\ L/\bar{L} = 0.75 \end{vmatrix} F \begin{vmatrix} r/R = 0.87 \\ L/\bar{L} = 1.20 \end{vmatrix}$$

$$G \begin{vmatrix} r/R = 0.97 \\ L/\bar{L} = 1.20 \end{vmatrix} H \begin{vmatrix} r/R = 1 \\ L/\bar{L} = 0.45 \end{vmatrix}$$

the lines joining these points to form the limit EFGH being straight-line segments with the exception of the segment GH of parabolic shape defined by:

$$L(r/R)/\bar{L} = 1.20 - 0.75 \, x^2$$

with $x = (r/R - 0.97)/0.03$.

Within these limits, with respect to the mean length $\bar{L}$ of the chord, the length L of the chord varies, preferably, over the longitudinal extent of the blade, in the following way:
r being the distance from an elementary transverse section of blade to the axis of rotation of the hub;
R0 being the distance from the inner edge of the blade to the axis of rotation of the hub;
R1 being the distance from the outer end of said first area to the axis of rotation of the hub;
R2 being the distance from the outer end of said second area to the axis of rotation of the hub;
R3 being the distance from the outer end of said third area to the axis of rotation of the hub; and
R being the distance from the outer edge of the blade to the axis of rotation of the hub.

a) first area from R0 to R1: linearly from $L0 = 0.778400 \, \bar{L}$ to $L1 = 1.095054 \, \bar{L}$
b) second area from R1 to R2: from L1 to $L2 = 1.104833 \, \bar{L}$ according to the function:

$$L(r/R)/\bar{L} = 1.103203 + 0.001630 \, x^3 - 0.008149 (1-x)^3 + 0.004889 \, x(1-x)(2x-1)$$

in which:

$$x = (r - R1)/(R2 - R1)$$

c) third area from R2 to R3: from $L2 = 1.104833 \, \bar{L}$ to $L3 = L2$, remaining constant
d) fourth area from R3 to R: from $L3 = 1.104833 \, \bar{L}$ to $L4 = 0.351543 \, \bar{L}$, according to the function:

$$L(r/R)/\bar{L} = 1.104833 - 0.753290 \, x^2$$

in which:

$$x = (r - R3)/R - R3).$$

Additionally, the offset Y'f of the aerodynamic center with respect to the pitch variation axis may lie between lower A'B'C'D' and upper E'F'G'H' limits, such that the coordinates of the points A', B', C' and D', are as follows:

$$A' \begin{vmatrix} r/R = 0 \\ Yf = 0 \end{vmatrix} B' \begin{vmatrix} r/R = 0.87 \\ Yf = 0.00435R \end{vmatrix}$$

$$C' \begin{vmatrix} r/R = 0.93 \\ Yf = -0.03165R \end{vmatrix} D' \begin{vmatrix} r/R = 1 \\ Yf = -0.11916R \end{vmatrix}$$

the lines joining these points to form the limit A'B'C'D' being straight-line segments, with the exception of the segment C'D' of parabolic shape defined by:

$$Yf(r/R)/R = -0.03165 - 0.04200 \, x - 0.04551 \, x^2$$

with $x = (r/R - 0.93)/0.07$ and the coordinates of the points E', F', G' and H' are as follows:

$$E' \begin{vmatrix} r/R = 0 \\ Yf = 0 \end{vmatrix} F' \begin{vmatrix} r/R = 0.87 \\ Yf = 0.02610R \end{vmatrix}$$

$$G' \begin{vmatrix} r/R = 0.97 \\ Yf = -0.00390R \end{vmatrix} H' \begin{vmatrix} r/R = 1 \\ Yf = -0.05557R \end{vmatrix}$$

the lines joining these points to form the limit E'F'G'H' being straight-line segments, with the exception of G'H' of parabolic shape defined by:

$$Yf(r/R)/R = -0.00390 - 0.00900 \, x - 0.04267 \, x^2$$

with $x = (r/R - 0.97)/0.03$.

Within these limits, the offset Y'f of the aerodynamic center with respect to the pitch variation axis changes, preferably, over the longitudinal extent of the blade, in the following way:

r being the distance from an elementary transverse section of blade to the axis of rotation of the hub;

R0 being the distance from the inside edge of the blade to the axis of rotation of the hub;

R1 being the distance from the outer end of said first area to the axis of rotation of the hub;

R2 being the distance from the outer end of said second area to the axis of rotation of the hub;

R3 being the distance from the outer end of said third area to the axis of rotation of the hub; and R being the distance from the outer edge of the blade to the axis of rotation of the hub.

a) first area from R0 to R1: linearly from Y0=0.0029242 to Y1=0.012282 R i.e. Y'f=0.014449 r b) second area from R1 to R2: from Y1 to Y2=0.003244 R according to the function:

$$Yf(r/R)/R - 0.01096890 - 0.00772363\ x^3 + 0.0013153(1-x^3) - 0.00451858\ x(1-x)(2x-1)$$

in which:

$$x = (r-R1)/(R2-r1)$$

c) third area from R2 to R3: linearly from Y2 to Y3=0.024733R d) fourth area from R3 to R: from Y3 to Y4=−0.089984R according to the function:

$$Yf(r/R)/R = -0.024733 - 0.023296\ x - 0.041955\ x^2$$

in which:

$$x = (r-R3)/(R-R3).$$

Moreover, the outer tip part of the blade exhibiting downward curvature at least approximately of parabolic shape, according to the invention, the vertical displacement Zv of the center of twist with respect to the zero lift plane of the blade, as defined later, lies between lower A"B"C"D" and upper E"F"G"M" limits, such that the coordinates of the points A", B", C" and D" are as follows:

$$A'' \begin{vmatrix} r/R = 0 \\ Zv/R = -0.001 \end{vmatrix} B'' \begin{vmatrix} r/R = 0.87 \\ Zv/R = -0.001 \end{vmatrix}$$

$$C'' \begin{vmatrix} r/R = 0.93 \\ Zv/R = -0.001 \end{vmatrix} D'' \begin{vmatrix} r/R = 1 \\ Zv/R = -0.015 \end{vmatrix}$$

the lines joining these points to form the limit A"B"C"D" being straight-line segments with the exception of the segment C"D" of parabolic shape defined by:

$$Zv(r/R)/R = -0.001 - 0.014\ x^2$$

with $x = (r/R - 0.93)/0.07$ and the coordinate of the points E", F", G" and H" are as follows:

$$E'' \begin{vmatrix} r/R = 0 \\ Zv/R = +0.001 \end{vmatrix} F'' \begin{vmatrix} r/R = 0.87 \\ Zv/R = +0.001 \end{vmatrix}$$

-continued $$G'' \begin{vmatrix} r/R = 0.97 \\ Zv/R = +0.001 \end{vmatrix} H'' \begin{vmatrix} r/R = 1 \\ Zv/R = -0.005 \end{vmatrix}$$

the lines joining these points to form the limit E"F"G"H" being straight-line segments, with the exception of the segment G"H" of parabolic shape defined by:

$$Zv(r/R)/R = +0.001 - 0.006\ x^2$$

with $x = (r/R - 0.97)/0.003$.

Within these limits, advantageously, the vertical displacement Zv of the center of twist with respect to the zero-lift plane of the blade is such that the center of twist remains substantially in the same plane in said first, second and third areas, and in the fourth area:

$$Zv(r/R)/R = -0.0905\ x^2$$

with $x = (r-R3)/(R-R3)$.

Preferably, the said first, second, third and fourth areas defined by:

R0=0.202380R, R1=0.850000R, R2=0.890000R and

R3=0.950000R.

Moreover, advantageously, in the area R0 to RI=0.40 to 0.50 R, preferably 0.46 R, of the blade and in the area RII=0.75 to 0.85 R, preferably 0.80 R, to R of the blade, the aerodynamic setting is linearly variable with the radius r and its rate of variation is advantageously at least substantially equal to −12° divided by the radius R, while, in the central area RI to RII, the rate of variation of the aerodynamic setting, which is also constant, is equal to 1.5 times the rate of variation of the aerodynamic setting of the areas R0 to RI and RII to R, advantageously at least substantially equal to −18° divided by the radius R.

By thus overtwisting the central part of the blade (RI to RII), it is possible better to exploit the operating regime over the profiles, by reducing the maximum lift demanded in retreating position, and by increasing it in an area where a large margin is available, namely in the center part of the advancing blade. In the case of high-speed flight, the tip of the advancing blade tilts, but the overtwisting does not aggravate this phenomenon in practice, whereas the gain on the side of the retreating blade is considerable. Overall, the power demanded by the rotor decreases by about 10% in this flight condition.

This translates into a deferral of the stall limit of the rotor, whose other beneficial effects are: the reduction in the dynamic stresses in the blades, the hub, and the control linkage, and the reduction in vibration.

Moreover, the intensity of the blade/vortex interaction is reduced by virtue, on the one hand, of the downward displacement of the marginal vortex and, on the other hand, to the reduction in the intensity of the vortex. The displacement of the vortex is ensured, in part, by the displacement of the profiles under the zero lift plane of the blade and, in part, by virtue of the significant rearwards shaping of the trailing edge, which also produces a downward displacement of the vortex by rotation of the blade around the pitch axis. The reduction in the intensity of the vortex is obtained by a reduction in the chord, progressive but significant, in the outer tip part of the blade ("wing tip"). This particular tapering offers the additional advantage of reducing mass in the area most remote from the pitch axis, thus facilitating inertial balancing.

The figures of the attached drawing will make it easy to understand how the invention can be produced. In these figures, identical references designate similar elements.

FIG. 7 is a curve showing the variation in the aerodynamic setting along the longitudinal extent of the blade.

Figure 1:
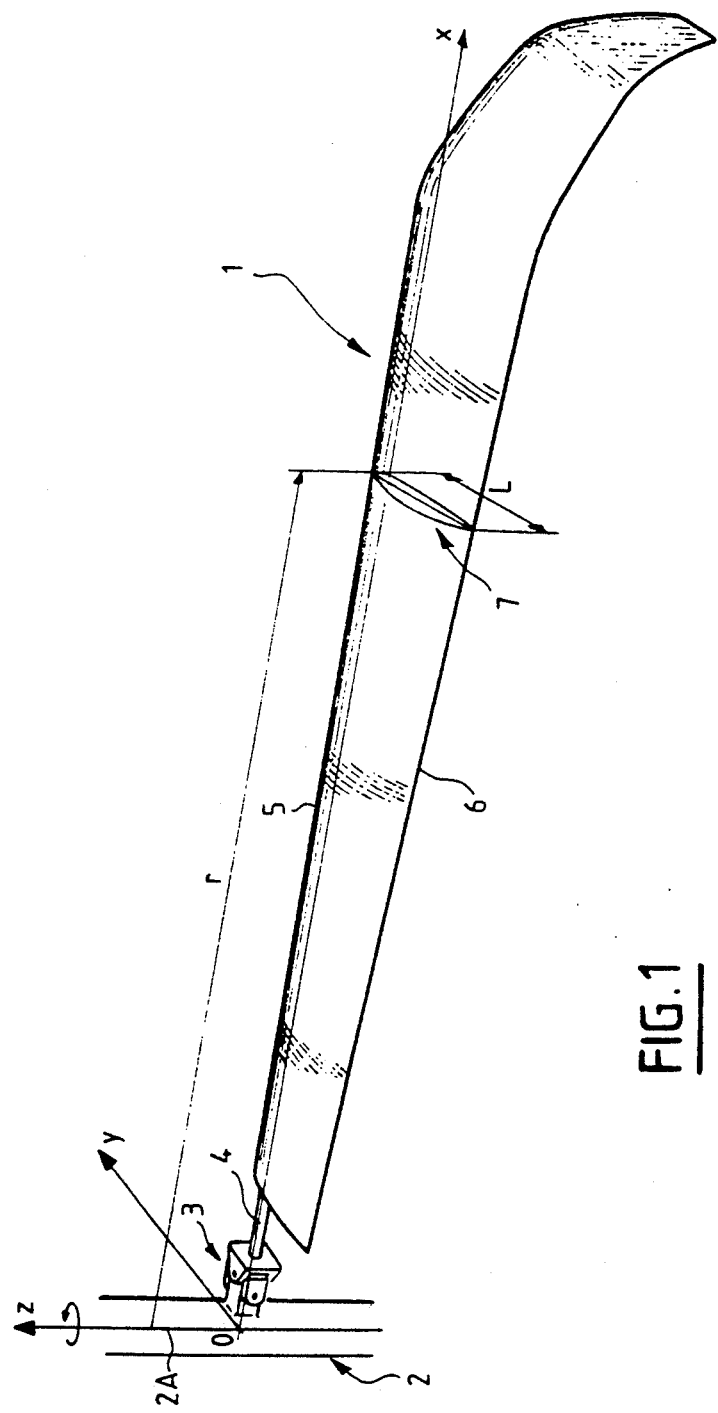
FIG. 1 is a diagrammatic view in perspective of a helicopter rotor blade in accordance with the present invention.

The blade 1 with a swept-back tip, in accordance with the present invention and shown by FIG. 1, forms part of a rotor whose hub 2 is illustrated purely diagrammatically and whose other blades are not represented. The blade 1 is linked to the hub 2 by articulation and retention members 3 of the blade, particularly a pitch change articulation for the blade around an axis 4 called pitch control variation axis, as is usual.

Moreover, the blade 1, including a leading edge 5 and a trailing edge 6, is formed by successive elementary transverse sections, one of which, 7, is represented in FIG. 1. Each elementary section 7 is identified by the distance r separating said section from the rotation axis 2A of the hub 2, and exhibits a defined chord profile L, and an aerodynamic center (point of application of the variations in the aerodynamic lift forces), whose "curve" along the longitudinal extent of the blade is represented at 8 in FIGS. 2 and 3. The offset of the aerodynamic center with respect to the pitch variation axis 4, orthogonal to said successive sections 7, determines the sweep back of the blade, as is better seen in FIGS. 2 and 3.

The geometric construction, allowing the surface of a blade 1 according to the invention to be defined rigorously, will be described below.

The construction reference datum is chosen as being a right-angled trihedron whose origin 0 is the center of the rotor.

The axis OX is the pitch variation axis 4, so that the first coordinate coincides with the radius r measured from the center of rotation 0. The second axis OY, orthogonal to the axis OX, constitutes the setting reference direction, and is directed, arbitrarily, toward the leading edge 5. The third axis OZ is orthogonal to the plane defined by the axes OX and OY, and is directed, arbitrarily, upward (upper surface of the profiles). The trihedron is in the direct sense if the rotor is turning counterclockwise. It is understood however, that all that follows remains valid for a rotor rotating in a clockwise direction.

The plane OX, OY will be called construction plane or reference plane. The plane OX, OY will be chosen so as to coincide with the zero-lift plane of the blade defined later. The surface of the blade (envelope of the blade) is generated by a set of elementary plane sections 7 which are all parallel to each other and to the plane OY, OZ, and orthogonal to the pitch variation axis OX.

Each elementary section can be identified by its radius r (distance of the section to the axis OY), lying between R0 (start of the aerodynamic part) and R (outer tip of the blade).

The parameters defining the contour of any elementary transverse section 7 of the blade 1 are the following:

the length of the chord L, measured perpendicular to the pitch axis ($\overline{L}$ being the mean length of the chord weighted by $r^2$);

the displacement of the aerodynamic center F with respect to the center of twist V parallel to the chord $\Delta Yf$, Yf and Zf being the coordinates of the center F (generally situated at the front quarter of the chord and at mid-thickness) in the construction reference system, and $\overline{Y}$ designating, in what follows, the position on the chord of the overall center; and Y'f being the position of the center projected onto the construction plane (without twisting);

the position of the center of twist V, given by its coordinates Yv and Zv in the construction reference frame;

the geometric setting $\theta g$ measured with respect to the OY direction, positive when nose-up, and deduced from the aerodynamic setting $\theta a$ by the relationship:

$$\theta g = \theta a + \alpha o$$

in which $\alpha o$ is the zero-lift incidence of the elementary section (in fact, the setting to be taken into account is not the geometric setting $\theta g$, but rather the aerodynamic setting $\theta a$ measured with respect to the zero-lift direction of the section. The separation $\theta g - \theta a$ is equal to the zero-lift incidence $\alpha o$ of the profile of the section in question. This separation is zero for symmetrical profiles, which have been abandoned nowadays, and the distinction between $\theta a$ and $\theta g$ is essential for modern profiles. The twist laws in question from now on, whether linear or not, therefore relate to the aerodynamic setting $\theta a$ );

the contour of the generic profile, described by a set of equations, or else by a numerical table.

Figure 8A:
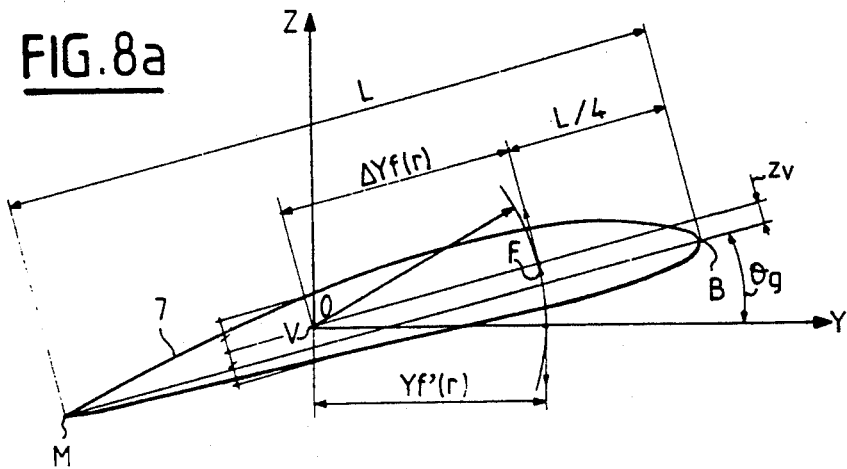
FIGS. 8a to 8c show elementary sections of the blade in different positions of its longitudinal extent.
Figure 8B:
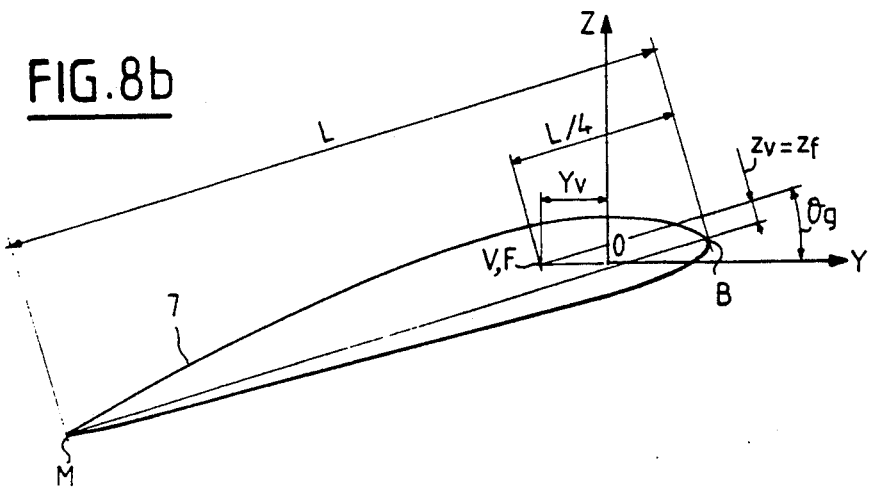
Figure 8C:
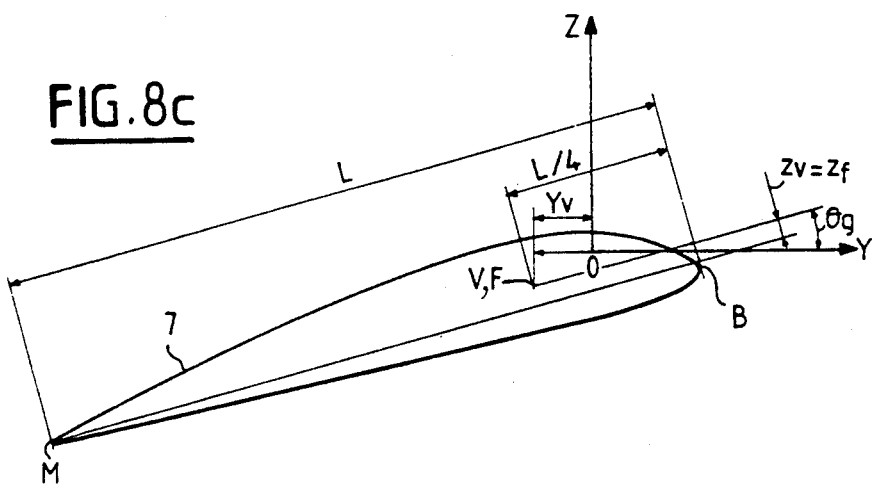

FIGS. 8a, 8b and 8c represent particular sections as described in what follows.

The position of the center F, of the leading edge B and that of the trailing edge M are deduced from the relationships:

$$F \begin{vmatrix} Yf = Yv + \Delta Yf \cos \theta g - \Delta Zf \sin \theta g \\ Zf = Zv + \Delta Zf \cos \theta g + \Delta Yf \sin \theta g \end{vmatrix}$$

$$B \begin{vmatrix} Yb = Yv + \Delta Yb \cos \theta g - \Delta Zb \sin \theta g \\ Zb = Zv + \Delta Zb \cos \theta g + \Delta Yb \sin \theta g \end{vmatrix}$$

$$M \begin{vmatrix} Ym = Yv + \Delta Ym \cos \theta g - \Delta Zm \sin \theta g \\ Zm = Zv + \Delta Zm \cos \theta g + \Delta Ym \sin \theta g \end{vmatrix}$$

with $$\Delta Yb = \Delta Yf + \tfrac{1}{4} L$$

$$\Delta Ym = \Delta Yf - \tfrac{3}{4} L$$

-continued and $$\Delta Zf = zf - zv$$

$$\Delta Zb = \Delta Zm = -zv,$$

zv and zf being the distances from the points v and F to the reference chord (mid-thickness of the profile at the abscissae ΔYb and ΔYf). ΔYf and ΔZf represent the position of the center with respect to the center of twist in the axes linked to the profile.

The aerodynamic center may be defined as the point of application of the lift variations relative to an incidence variation. It is situated, generally, close to a quarter of the chord measured from the leading edge.

The aerodynamic setting θa is defined, generally, to within an additive constant (FIG. 7). One method making it possible to determine this constant, and hence to position the sections with respect to the OX, OY plane, so as to make the latter correspond to the zero-lift plane (total aerodynamic lift of the blade 1 exactly zero if the rotation of this blade takes place around the axis OZ and if in hovering flight), is as follows:
the integral is calculated:

$$SN = \int_{R0}^{R} \theta a(r) \cdot L(r) \cdot r^2 \cdot dr$$

which may be positive or negative;
the integral is calculated:

$$SD = \int_{R0}^{R} L(r) \cdot r^2 \cdot dr$$

the constant SN/SD is subtracted from θa(r), so that the expression $$\int_{R0}^{R} [\theta a(r) - [SN/SD]] \cdot L(r) \cdot r^2 \cdot dr$$

is exactly zero;
the sections are set geometrically with respect to the OX,OY plane according to the appropriate angle θa(r)−[SN/SD]+αo, which confers on the OX,OY plane the abovementioned properties of the zero-lift plane.

The blade which forms the subject of the invention is subdivided into four areas, making it possible to describe it, independently of the twisting which requires a particular sectioning specified below. These four areas are:
area 1, called inner part, which extends from the section R0, Corresponding to the start of the aerodynamic part, out to the section R1 situated between 75% and 87% of the total radius R;
area 2, called transition part, which extends from the section R1 out to the section R2 situated between 87% and 93% of the total radius R;
area 3, called swept-back part, which extends from section R2 out to Section R3 situated between 93% and 97% of the total radius R;
area 4, called "wing tip", which extends from the section R3 out to the free end of the blade (radius R).

The description of twisting requires a sectioning into three areas:
area I which extends from the section R0 out to the section RI situated between 40% and 50% of the total radius R;
area II (central part) which extends from the section RI out to the section RII situated between 75% and 85% of the total radius R;
area III which extends from section RII out to the free end of the blade (radius R).
By way of a preferred embodiment example, it is possible to define the four areas 1, 2, 3 and 4 above as follows:

R0=0.202380R, R1=0.850000R, R2=0.890000R,
R3=0.950000R.

Figure 4:
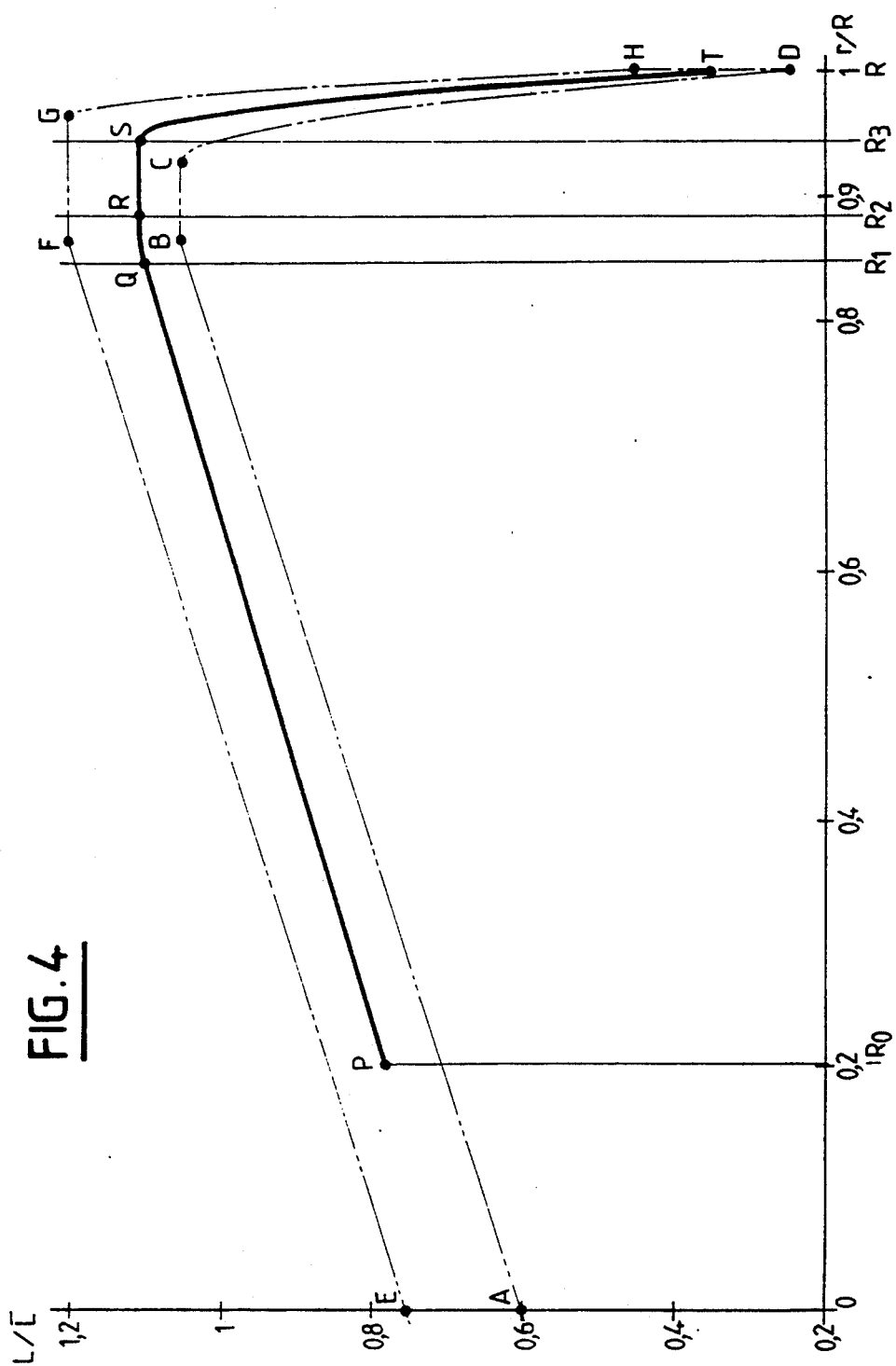
FIG. 4 is a curve showing the variation in the length of the chord along the longitudinal extent of the blade.
Figure 5:
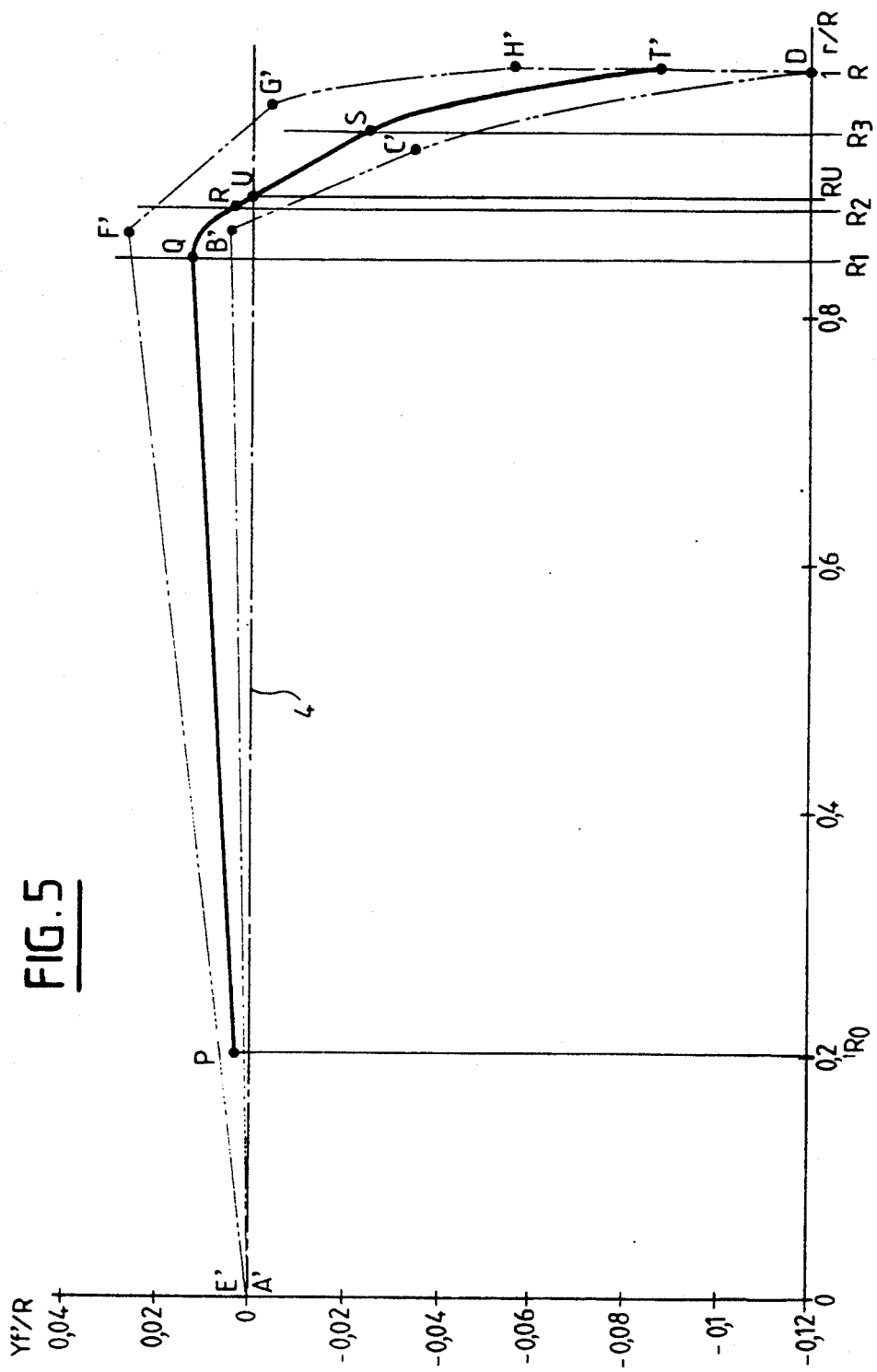
FIG. 5 is a curve showing the change in the offset of the aerodynamic center along the longitudinal extent of the blade.

It will be noted that the sections 7 represented in FIGS. 8a, 8b and 8c are such that:
for FIG. 8a: r≦RU, the point U is defined in FIG. 5 and the point V is arranged, in the present case, on the axis OX and at mid-thickness of the profile;
for FIG. 8b: RU<r≦R3, then the points F and V are coincident when they are at mid-thickness of the profile (Zv=Zf) and are situated in the OX,OY plane;
for FIG. 8c: r>R3, the points F and V remain coincident when they are arranged at mid-thickness of the profile but are situated under the OX,OY plane.
The chord law changes according to the curve PQRST of FIG. 4 (change in the chord L with respect to the mean chord $\bar{L}$ along the span of the blade):
segment PQ (area 1): the change is linear from L0=0.778400 $\bar{L}$ out to L1=1,095054 $\bar{L}$
segment QR (area 2): the change is cubic from L1 out to L2=1.104833 $\bar{L}$, according to the function:

$$L(r/R)/L/ = 1.103203 + 0.001630$$
$$x^3 - 0.008149(1-x)^3 + 0.004889\ x(1-x)(2x-1)$$

where x=(r−R1)/(R2−R1)

segment RS (area 3): the chord is constant and equal to L2=L3=1.104833 $\bar{L}$
segment ST (area 4): the change is parabolic from L3=1.104833 $\bar{L}$ out to L4=0.351543 $\bar{L}$, according to the function:

$$L(r/R)/L/ = 1.104833 - 0.753290\ x^2$$

where x=(r−R3)/(R−R3).

The expressions above are chosen so as to provide a continuous change in the derivative dL/dr, a necessary condition for the leading edge 5 and the trailing edge 6 of the blade 1 not to exhibit any break.
The offset of the aerodynamic center F with respect to the pitch variation axis determines the local sweepback angle:

$$v = tg^{-1}(dYf/dr).$$

In FIG. 5, the offset of the center is defined by its projection onto the construction plane OX,OY, i.e. Y'f=Yv +ΔYf, which changes according to the curve PQRST:
segment PQ (area 1): the change is linear from Y0=0.0029242 R out to Y1=0.012282 R i.e.: Y'f=0.014449 r segment QR (area 2): the change is cubic from Y1 out to Y2=0.003244 R according to the function:

$$Y'f(r/R)/R = 0.01096890 - 0.00772363x^3 + 0.00131353(1-x^3) - 0.00451858x(1-x)(2x-1)$$

in which:

$$x = (r-R1)/(R2-R1)$$

segment RS (area 3): the change is linear from Y2 to Y3=−0.024733R (this corresponds to a constant sweep-back angle $v=25°$)

segment ST (area 4): the change is parabolic from Y3 to Y4=−0.089984R according to the function:

$$Y'f(r/R)/R = -0.024733 - 0.023296x - 0.041955x^2$$

in which:

$$x = (r-R3)/(R-R3).$$

The expressions above are chosen so as to ensure continuous change in the derivative $dY'f/dr$, a necessary condition for the leading edge and the trailing edge of the blade not to exhibit any "break".

Moreover, by virtue of the choice of the parameters above, the overall center of the blade, point of application of the lift variations, and defined by its position $\overline{Y}$ with respect to the pitch axis:

$$\overline{Y} = \frac{\int_{R0}^{R} Y'f(r)L(r)r^2 dr}{\int_{R0}^{R} L(r)r^2 dr} \quad \frac{\int_{R0}^{R} Y'f(r)L(r)r^2 dr}{\overline{L}\int_{R0}^{R} r^2 dr}$$

is practically coincident with the pitch axis:
$\overline{Y} = -0.0008R$, so that the aerodynamic torsion forces on the blade root, as well as the aerodynamic part of the force on the link rod are minimized.

It will be noted, for a blade with a fixed mean chord $\overline{L}$, that another choice of the distribution of the four abovementioned areas 1, 2, 3 and 4, but still within the previously defined limits, may be associated with parameters suitably determined for the general laws proposed above for the variations along the extent of the blade of the chord L with respect to the mean chord $\overline{L}$ on the one hand, and the offset Y'f of the aerodynamic-center with respect to the pitch variation axis on the other hand, so as to substantially ensure the positioning of the overall aerodynamic center of the blade with respect to the pitch variation axis.

It will also be noted that the offset of the center which is equal to:

$$Yf = Yv + \Delta Yf$$

may be obtained by various combinations of the offset of the center of twist Yv and of the offcentering $\Delta Yf$. However, it is desirable to keep the center of twist V coincident with the pitch variation axis in the area of the blade root and over the larger park of the wing span, so as to keep the straight-line shape for the blade when seen from the front and thus to minimize the deflection induced by centrifugal force. In practice, Yv will be zero from the blade root out to the point of intersection U of the line of the centers with the pitch variation axis (FIG. 5). Beyond this point, the center of twist will be coincident with the center:

$$r < RU : Yv(r) = 0, \Delta Yf = Y'f(r)$$

$$r > RU : Yv(r) = Y'f(r), \Delta Yf(r) = 0$$

Figure 6:
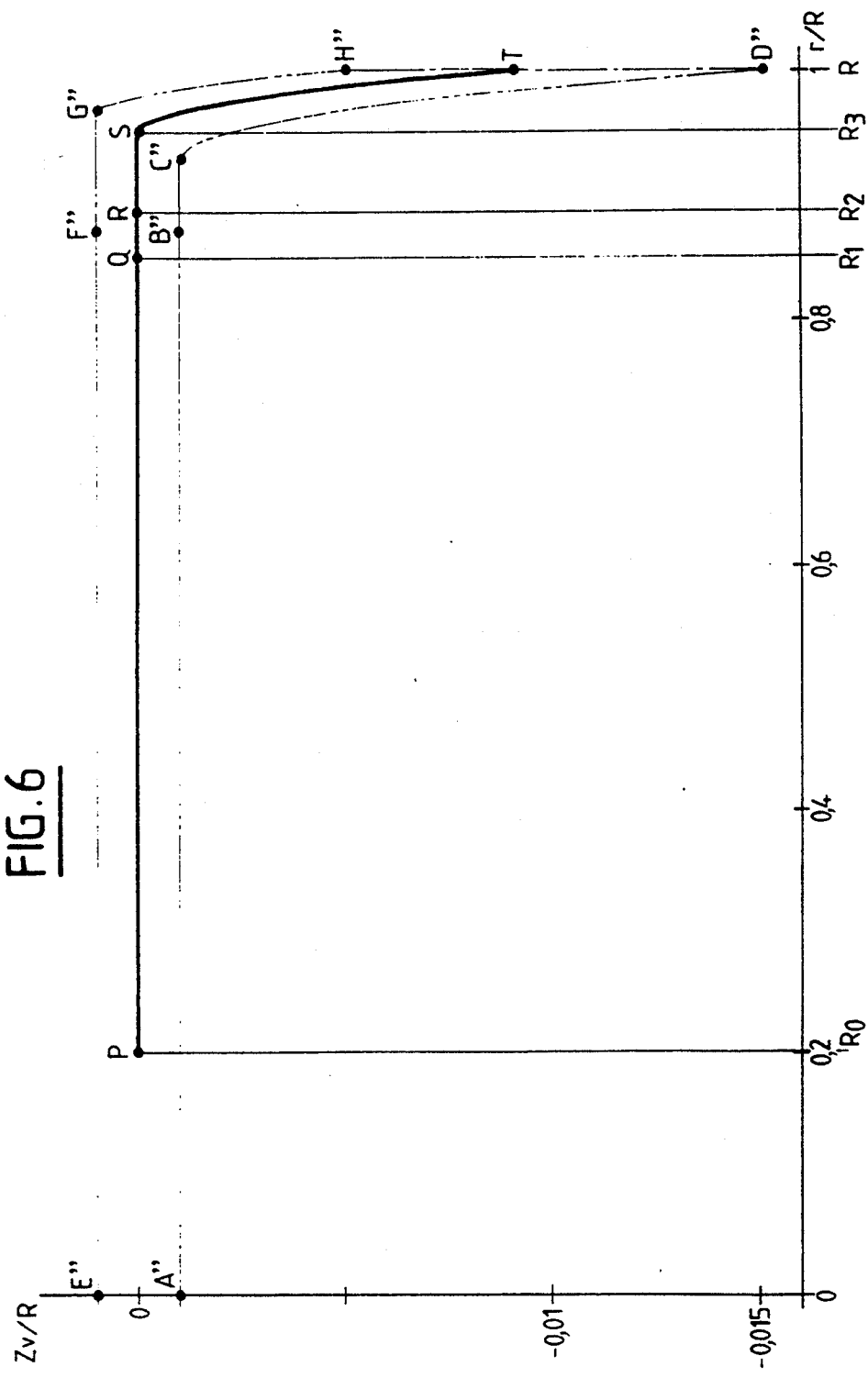
FIG. 6 is a curve showing the vertical displacement of the center of twist with respect to the construction plane, as defined below, of the blade.

Moreover, the vertical displacement Zv of the center of twist V with respect to the construction plane defined above changes according to the curve PQRST of FIG. 6:

over segments PQ, QR and RS (areas 1,2,3), the center of twist is in the construction plane: Zv=0, over the segment ST (area 4), the change is parabolic from Zv=0 out to Zv=−0.0905 R according to the function:

$$Zv(r/R)/R = -0.0905 x^2$$

with $x = (r-R3)/(R-R3)$.

This progressive downward displacement makes it possible to bring the trailing edge of a blade, and hence the marginal vortex, to a position such that the interaction with the following blade is significantly reduced, in particular in hovering flight and descent configurations.

Moreover, the aerodynamic setting $\theta a$ can be distributed along the line KLMN of FIG. 7. The three areas are defined by the following sections I and II:

$$RI = 0.46R \quad RII = 0.80R.$$

In the areas I and III, the rate of twisting is constant and can be equal to −12° referring to the total radius R, while, in the central area II (segment LM), it is constant and can be equal to −18° referring to the total radius R, i.e. an increase of 50% with respect to the other areas I and III (FIG. 7).

In fact, in order to push back the stall limit, it is sufficient to increase the twist in the central part RI to RII by about 50% without modifying it over the rest of the blade. A simple criterion described below makes it possible to determine whether a given twist law possesses this property.

In FIG. 7, the straight line KN is drawn (in broken lines) joining the first aerodynamic section R0 to the outer end R, the points I and J are determined, the intersections of this straight line KN with the sections at 50% and 80% of R, and the points I' and J' are determined, giving the aerodynamic setting in the region of these sections at 50% and 80% of R.

The criterion consists in examining the separations $(\theta I'' - \theta I)$ and $(\theta J' - \theta J)$ by comparing them with the setting separation between the two ends $(\theta K - \theta N)$:

if $0.03(\theta K - \theta N) < (\theta I' - \theta I) < 0.10(\theta K - \theta N)$ and $-0.10(\theta K - \theta N) < (\theta J' - \theta J) < -0.03(\theta K - \theta N)$ then the twist law examined possesses the abovementioned property.

Moreover, the previously defined variations in the chord, in the aerodynamic center (sweep back), and in the vertical displacement of the center of twist (dihedral) may lie between the limits ABCD and EFGH, A'B'C'D' and E'F'G'H', and A"B"C"D" and E"F"G"H" of FIGS. 4, 5 and 6, respectively, while keeping the required properties of the blade according to the invention. These limits are defined by the following points:

1) for the law of variation of the chord, lower limit ABCD, such that the coordinates of the points A, B, C and D are as follows:

$$A\begin{vmatrix} r/R = 0 \\ L/L = 0.60 \end{vmatrix} B\begin{vmatrix} r/R = 0.87 \\ L/L = 1.05 \end{vmatrix}$$

$$C\begin{vmatrix} r/R = 0.93 \\ L/L = 1.05 \end{vmatrix} D\begin{vmatrix} r/R = 1 \\ L/L = 0.25 \end{vmatrix}$$

the lines joining these points to form the limit ABCD are straight-line segments with the exception of the segment CD of parabolic shape defined by:

$$L(r/R)/L/ = 1.05 - 0.80\, x^2$$

with $x = (r/R - 0.93)/0.07$ upper limit EFGH such that the coordinates of the points E, F, G and H are as follows:

$$E\begin{vmatrix} r/R = 0 \\ L/L = 0.75 \end{vmatrix} F\begin{vmatrix} r/R = 0.87 \\ L/L = 1.20 \end{vmatrix}$$

$$G\begin{vmatrix} r/R = 0.97 \\ L/L = 1.20 \end{vmatrix} H\begin{vmatrix} r/R = 1 \\ L/L = 0.45 \end{vmatrix}$$

the lines joining these points to form the limit EFGH are straight-line segments with the exception of the segment GH of parabolic shape defined by:

$$L(r/R)/L/ = 1.20 - 0.75\, x^2$$

with $x = (r/R - 0.97)/0.03$ 2) for the law of variation of the aerodynamic center upper limit E"F"G"H", such that the coordinates of the points E", F", G" and H" are as follows:

$$A'\begin{vmatrix} r/R = 0 \\ Yf = 0 \end{vmatrix} B'\begin{vmatrix} r/R = 0.87 \\ Yf = 0.00435R \end{vmatrix}$$

$$C'\begin{vmatrix} r/R = 0.93 \\ Yf = -0.03165R \end{vmatrix} D'\begin{vmatrix} r/R = 1 \\ Yf = -0.11916R \end{vmatrix}$$

the lines joining these points to form the limit A'B'C'D' are straight-line segments, with the exception of the segment C'D' of parabolic shape defined by:

$$Yf(r/R)R = -0.03165 - 0.04200x - 0.04551\, x^2$$

with $x = (r/R - 0.93)/0.07$ upper limit E'F'G'H', such that the coordinates of the points E', F', G' and H' are as follows:

$$E'\begin{vmatrix} r/R = 0 \\ Yf = 0 \end{vmatrix} F'\begin{vmatrix} r/R = 0.87 \\ Yf = 0.02610R \end{vmatrix}$$

$$G'\begin{vmatrix} r/R = 0.97 \\ Yf = -0.00390R \end{vmatrix} H'\begin{vmatrix} r/R = 1 \\ Yf = -0.05557R \end{vmatrix}$$

the lines joining these points to form the limit E'F'G'H' being straight-line segments, with the exception of G'H' of parabolic shape defined by:

$$Yf(r/R)/R = -0.00390 - 0.00900\, x - 0.04267\, x^2$$

with $x = (r/R - 0.97)/0.03$.

3) for the vertical displacement of the center of twist lower limit A"B"C"D", such that the coordinates of the points A"B"C"D" are as follows:

$$A''\begin{vmatrix} r/R = 0 \\ Zv/R = -0.001 \end{vmatrix} B''\begin{vmatrix} r/R = 0.87 \\ Zv/R = -0.001 \end{vmatrix}$$

$$C''\begin{vmatrix} r/R = 0.93 \\ Zv/R = -0.001 \end{vmatrix} D''\begin{vmatrix} r/R = 1 \\ Zv/R = -0.015 \end{vmatrix}$$

the lines joining these points to form the limit A"B"C"D" being straight-line segments with the exception of the segment C"D" of parabolic shape defined by:

$$Zv(r/R)/R = -0.001 - 0.014\, x^2$$

with $x = (r/r - 0.93)/0.07$ upper limits E"F"G"H", such that the coordinates of the points E", F", G" and H" are as follows:

$$E''\begin{vmatrix} r/R = 0 \\ Zv/R = +0.001 \end{vmatrix} F''\begin{vmatrix} r/R = 0.87 \\ Zv/R = +0.001 \end{vmatrix}$$

$$G''\begin{vmatrix} r/R = 0.97 \\ Zv/R = +0.001 \end{vmatrix} H''\begin{vmatrix} r/R = 1 \\ Zv/R = -0.005 \end{vmatrix}$$

the lines joining these points to form the limit E"F"G"H" are straight-line segments, with the exception of G"H" of parabolic shape defined by:

$$Zv(r/R)/R = +0.001 - 0.006\, x^2$$

with $x = (r/R - 0.97)/0.03$.

Figure 2:
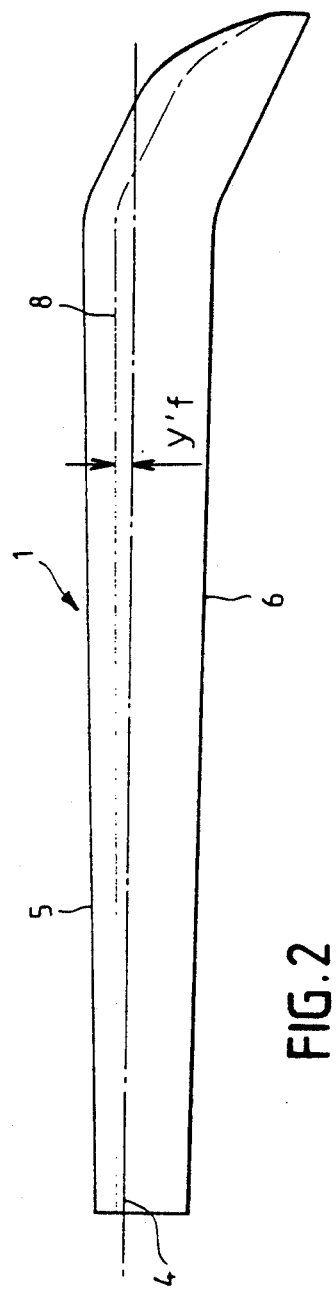
FIGS. 2 and 3 illustrate, seen from above, two examples of an embodiment of the blade according to the invention.
Figure 3:
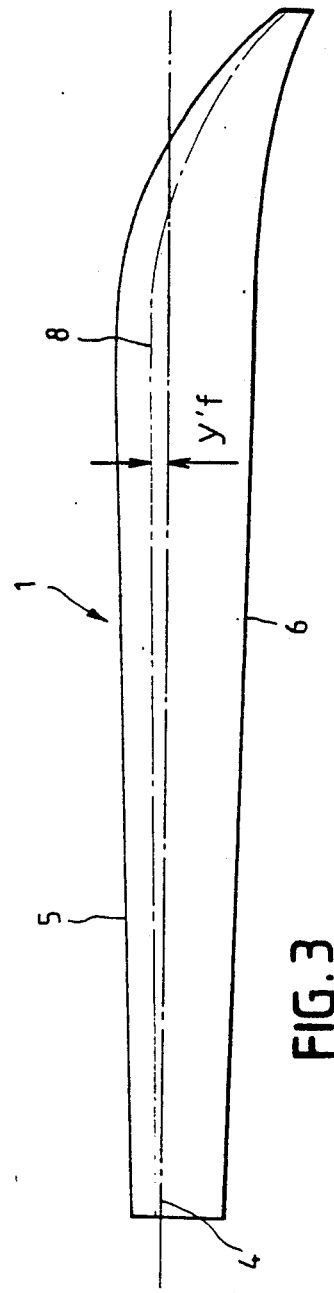

It will be noted that FIG. 3, with respect to the representation of FIG. 2, shows a plan shape of a blade 1, obtained by further extending the transition area (area 2) toward its-tip, and by extending the "wing tip" (area 4) further inward, until the points R and S of FIGS. 4, 5 and 6 are substantially coincident.

In summary, the present invention uses four original geometric characteristics to define the blade 1:
1) the radial distribution of the surface of the blade, in the shape of a chord law: $L/\overline{L} = f(r/R)$;
2) the radial distribution of the sweep back, in the form of a law of displacement of the center in the direction of the chord:

$$Yf/R = f(r/R);$$

3) the radial distribution of the dihedral, in the form of a law of displacement of the center of twist out of the construction plane: $Zv/R = f(r/R)$;
4) the radial distribution of the twisting, in the form of a setting law: $\theta a = f(r/R)$.

These four characteristics are employed to combat the three phenomena limiting the performance of the rotor: the shock waves, the stall and the blade/vortex interaction.

We claim:
1. Blade with a swept-back tip for aircraft rotary wings, intended to form part of a rotor whose hub (2) is linked to said blade (1), which is capable of being driven in rotation around the axis of said hub, said blade (1) including a leading edge (5) and a trailing edge (6) and being formed by successive elementary transverse sections (7), identified by the distance r separating each of them from the axis of rotation of said hub, and each exhibiting a defined chord profile and an aerodynamic center whose offset with respect to the pitch variation axis, orthogonal to each of said sections, determines the sweepback of said wing, wherein said blade (1) being subdivided, along its longitudinal extent, into four areas, namely a first area extending from the inner edge of the blade R0 to a first section R1 situated between 75% and 875 of the total length of the blade, measured from the axis of rotation of the hub, a second area extending from the first section R1 to a second section R2 situated between 87% and 93% of the total length of the blade, a third area extending from the second section R2 to a third section R3 situated between 93% and 97% of the total length of the blade and a fourth area extending from the third section R3 to the free outer edge R of the blade, the length of the chord L increases generally linearly in said first area, changes according to a cubic function in said second area, is constant in said third area, and changes according to a parabolic function in said fourth area so that the blade (1) exhibits a double progressive taper toward the inner and outer edges of the blade, the variation in the length of the chord being such that the leading edge (5) and the trailing edge (6) of the blade, along its longitudinal extent, exhibit no break, the leading edge including only convex and straight-line segments and the trailing edge only concave and straight-line segments, and the offset Y′f of the aerodynamic center with respect to the pitch variation axis varies linearly in said first area so that the aerodynamic center is offset toward the leading edge (5) in this area, changes according to a cubic function in said second area, varies linearly in said third area, and changes according to a parabolic function in said fourth area so that the blade (1) exhibits a rearward sweepback, the variation in the offset of the aerodynamic center being such that the leading edge (5) and the trailing edge (6) of the blade, along its longitudinal extent, exhibit no break.

2. The blade as claimed in claim 1, wherein the variation in the length L of the chord with respect to the mean length $\overline{L}$ of the latter lies between lower ABCD and upper EFGH limits, such that the coordinates of the points A, B, C and D are as follows:

$$A \left| \begin{array}{l} r/R = 0 \\ L/\overline{L} = 0.60 \end{array} \right. B \left| \begin{array}{l} r/R = 0.87 \\ L/\overline{L} = 1.05 \end{array} \right.$$

$$C \left| \begin{array}{l} r/R = 0.93 \\ L/\overline{L} = 1.05 \end{array} \right. D \left| \begin{array}{l} r/R = 1 \\ L/\overline{L} = 0.25 \end{array} \right.$$

the lines joining these points to form the limit ABCD being straight-line segments with the exception of the segment CD of parabolic shape defined by:

$$L(r/R)/\overline{L} = 1.05 - 0.80\ x^2$$

with $x = (r/R - 0.93)/0.07$ and the coordinates of the points E, F, G and H are as follows:

$$E \left| \begin{array}{l} r/R = 0 \\ L/\overline{L} = 0.75 \end{array} \right. F \left| \begin{array}{l} r/R = 0.87 \\ L/\overline{L} = 1.20 \end{array} \right.$$

$$G \left| \begin{array}{l} r/R = 0.97 \\ L/\overline{L} = 1.20 \end{array} \right. H \left| \begin{array}{l} r/R = 1 \\ L/\overline{L} = 0.45 \end{array} \right.$$

the lines joining these points to form the limit EFGH being straight-line segments with the exception of the segment GH of parabolic shape defined by:

$$L(r/R)/\overline{L} = 1.20 - 0.75\ x^2$$

with $x = (r/R - 0.97)/0.03$.

3. The blade as claimed in claim 1, wherein the offset Y′f of the aerodynamic center of each section with respect to the pitch variation axis lies between lower A′B′C′D′ and upper E′F′G′H′ limits, such that the coordinates of the points A′, B′, C′ and D′, are as follows:

$$A' \left| \begin{array}{l} r/R = 0 \\ Yf = 0 \end{array} \right. B' \left| \begin{array}{l} r/R = 0.87 \\ Yf = 0.00435R \end{array} \right.$$

$$C' \left| \begin{array}{l} r/R = 0.93 \\ Yf = -0.03165R \end{array} \right. D' \left| \begin{array}{l} r/R = 1 \\ Yf = -0.11916R \end{array} \right.$$

the lines joining these points to form the limit A′B′C′D′ being straight-line segments, with the exception of the segment C′D′ of parabolic shape defined by:

$$Yf(r/R)/R = -0.03165 - 0.04200\ x - 0.04551\ x^2$$

with $x(r/R - 0.93)/0.07$ and the coordinates of the points E′, F′, G′ and H′ are as follows:

$$E' \left| \begin{array}{l} r/R = 0 \\ Yf = 0 \end{array} \right. F' \left| \begin{array}{l} r/R = 0.87 \\ Yf = 0.02610R \end{array} \right.$$

$$G' \left| \begin{array}{l} r/R = 0.97 \\ Yf = -0.00390R \end{array} \right. H' \left| \begin{array}{l} r/R = 1 \\ Yf = -0.05557R \end{array} \right.$$

the lines joining these points to form the limit E′F′G′H′ being straight-line segments, with the exception of G′H′ of parabolic shape defined by:

$$Yf(r/R)/R = -0.00390 - 0.00900\ x - 0.04267\ x^2$$

with $x(r/R - 0.97)/0.03$.

4. The blade as claimed in claim 1, wherein the outer tip part of the blade exhibits downward curvature at least approximately of parabolic shape, wherein the vertical displacement Zv of the center of twist with respect to the zero-lift plane of the blade lies between lower A″B″C″D″ and upper E″F″G″H″ limits, such that the coordinates of the points A″, B″, C″ and D″ are as follows:

$$A'' \left| \begin{array}{l} r/R = 0 \\ Zv/R = -0.001 \end{array} \right. B'' \left| \begin{array}{l} r/R = 0.87 \\ Zv/R = -0.001 \end{array} \right.$$

-continued $$C''\begin{vmatrix} r/R = 0.93 \\ Zv/R = -0.001 \end{vmatrix} D''\begin{vmatrix} r/R = 1 \\ Zv/R = -0.015 \end{vmatrix}$$

the lines joining these points to form the limit A"B"C"D" being straight-line segments with the exception of C"D" of parabolic shape defined by:

$$Zv(r/R)/R = -0.001 - 0.014\, x^2$$

with $x = (r/R - 0.93)/0.07$ and the coordinates of the points E", F", G" and H" are as follows:

$$E''\begin{vmatrix} r/R = 0 \\ Zv/R = +0.001 \end{vmatrix} F''\begin{vmatrix} r/R = 0.87 \\ Zv/R = +0.001 \end{vmatrix}$$

$$G''\begin{vmatrix} r/R = 0.97 \\ Zv/R = +0.001 \end{vmatrix} H''\begin{vmatrix} r/R = 1 \\ Zv/R = -0.005 \end{vmatrix}$$

the lines joining these points to form the limit E"F"G"H" being straight-line segments, with the exception of G"H" of parabolic shape defined by:

$$Zv(r/R)/R = -0.001 - 0.006\, x^2$$

with $x = (r/R - 0.97)/0.03$.

5. The blade as claimed in claim 1, in which, in the area R0 to RI=0.40 to 0.50 R of the blade and in the area RII=0.75 to 0.85 R to R of the blade, the rate of variation of the aerodynamic setting is constant and equal to a predetermined value, whereas, in the central area RI to RII, the rate of variation of the aerodynamic setting which is constant, is at least substantially equal to 1.5 times said predetermined value.

6. The blade as claimed in claim 2, wherein, with respect to the mean length $\overline{L}$ of the chord, the length L of the chord varies, over the longitudinal extent of the blade, in the following way:

r being the distance from an elementary transverse section of blade to the axis of rotation of the hub;
R0 being the distance from the inside edge of the blade to the axis of rotation of the hub;
R1 being the distance from the outer end of said first area to the axis of rotation of the hub;
R2 being the distance from the outer end of said second area to the axis of rotation of the hub;
R3 being the distance from the outer end of the third area to the axis of rotation of the hub; and
R being the distance from the outer edge of the blade to the axis of rotation of the hub.

a) first area from R0 to R1: linearly from L0=0.778400 $\overline{L}$ to L1=1.095054 $\overline{L}$
b) second area from R1 to R2: from L1 to L2=1.104833 $\overline{L}$ according to the function:

$$L(r/R)/\overline{L} = 1.103203 + 0.001630\, x^3 - 0.008149\,(1-x)^3 + 0.004889\, x(1-x)(2x-1)$$

in which:

$$x = (r-R1)/(R2-R1)$$

c) third area from R2 to R3: L2=L3=1.104833 $\overline{L}$
d) fourth area from R3 to R: from L3=1.104833 $\overline{L}$ to L4=0.351543 $\overline{L}$ according to the function:

$$L(r/R)\overline{L}/ = 1.104833 - 0.753290\, x^2$$

in which:

$$x = (r-R3)(R-R3).$$

7. The blade as claimed in claim 2 with fixed chord $\overline{L}$ subdivided into four areas defined along its longitudinal extent, wherein the parameters of the laws of variation along said longitudinal extent and for each of said areas, on the one hand of length L of the chord of each section with respect to the mean chord $\overline{L}$ and, on the other hand, of the offset Y'f of the aerodynamic center of each section with respect to the pitch variation axis, substantially ensure the positioning of the overall aerodynamic center of said blade on said pitch variation axis.

8. The blade as claimed in claim 4, wherein the vertical displacement Zv of the center of twist with respect to the zero-life plane of the blade is such that the center of twist remains substantially in the same plane in said first, second and third areas, and in the fourth area:

$$Zv(r/R)/R = -0.0905\, x^2$$

with $x = (r-R3)/(R-R3)$.

9. The blade as claimed in claim 5, wherein said predetermined value is at least substantially equal to $-12°$ divided by the radius R, whereas, in the central area RI to RII, the rate of variation of the aerodynamic setting is at least substantially equal to $-18°$ divided by the radius R.

10. The blade as claimed in claim 5, wherein RI=0.46R and RII=0.80R.

11. The blade as claimed in claim 6, wherein the said first, second, third and fourth areas are defined by: R0=0.202380R, R1=0.850000R, R2=0.890000R and R3=0.0950000R.

12. The blade as claimed in claim 11, wherein, in order substantially to ensure the positioning of the overall aerodynamic center of said blade on the pitch axis, the offset Y'f of the aerodynamic center of each section with respect to the pitch variation axis changes, over the longitudinal extent of the blade, in the following way:

r being the distance from an elementary transverse section of blade to the axis of rotation of the hub;
R0 being the distance from the inside edge of the blade to the axis of rotation of the hub;
R1 being the distance from the outer end of said first area to the axis of rotation of the hub;
R2 being the distance from the outer end of said second area to the axis of rotation of the hub;
R3 being the distance from the outer end of said third area to the axis of rotation of the hub;
R being the distance from the outer edge of the blade to the axis of rotation of the hub.

a) first area from R0 to R1: from Y0=0.0029242 R to Y1=0.012282 R i.e. Y'f=0.014449 r
b) second area from R1 to R2: from Y1 to Y2=0.003244 according to the function:

$$Yf(r/R)/R = 0.01096890 - 0.00772363\, x^3 + 0.00131353\,(1-x^3) - 0.00451858\, x(1-x)(2x-1)$$

in which:
$$x = (r-R1)/(R2-R1)$$

c) third area from R2 to R3: from Y2 to Y3 = −0.024733R
d) fourth area from R3 to R: from Y3 to Y4 = −0.089984R according to the function:

$$Yf(r/R)/R = -0.024733 - 0.023296x - 0.041955x^2$$

in which:

$$x = (r - R3)/(R - R3).$$

* * * * *

UNITED STATES PATENT AND TRADEMARK OFFICE
CERTIFICATE OF CORRECTION

PATENT NO. : 5,332,362                    Page 1 of 6

DATED : July 26, 1994

INVENTOR(S) : FRANCOIS V. TOULMAY ET AL.

It is certified that error appears in the above-identified patent and that said Letters Patent is hereby corrected as shown below:

[57] Abstract, line 6, "Being" should be --being--

Col. 1, line 18, "With" should be --with--

Col. 1, line 42, "E" should be --$\underline{r}$--

Col. 1, line 44, "L" should be --$\overline{L}$--
(Spec., page 2, line 11)

Col. 1, line 45, "r" should be --$\underline{r}$--

Col. 1, in the equation at line 50, the "L" furthest to the left, should be --$\overline{L}$--

Col. 1, line 52, "E" should be --r--

Col. 2, line 30, "$\Delta$" should be --$\Lambda$--

Col. 3, line 38, "blade" should be --blades--

Col. 3, line 40, "mid-thicness" should be --mid-thickness--

UNITED STATES PATENT AND TRADEMARK OFFICE
CERTIFICATE OF CORRECTION

PATENT NO. : 5,332,362

DATED : July 26, 1994

INVENTOR(S) : FRANCOIS V. TOULMAY ET AL.

It is certified that error appears in the above-identified patent and that said Letters Patent is hereby corrected as shown below:

Col. 5, between lines 25-30, equations lettered A, B, C, and D, second line of each, "L/L" should be --L/$\overline{L}$--

Col. 5, line 32, "Joining" should be --joining--

Col. 5, line 36, "L(r/R)/L/" should be --L(r/R)/$\overline{L}$--

Col. 5, line 45, equations lettered E, F, G, and H, second line of each, "L/L" should be --L/$\overline{L}$--

Col. 5, line 54, "L(r/R)/L/" should be --L(r/R)/$\overline{L}$--

Col. 6, line 10, "L(r/R)/L/" should be --L(r/R)/$\overline{L}$--

Col. 6, line 21, "L(r/R)/L/" should be --L(r/R)/$\overline{L}$--

Col. 7, line 19, "+0.0013153" should be --+0.00131353--

Col. 8, line 35, "r" should be --$\underline{r}$--

Col. 9, line 41, "r" should be --$\underline{r}$--

UNITED STATES PATENT AND TRADEMARK OFFICE
CERTIFICATE OF CORRECTION

PATENT NO. : 5,332,362

DATED : July 26, 1994

INVENTOR(S) : FRANCOIS V. TOULMAY ET AL.

It is certified that error appears in the above-identified patent and that said Letters Patent is hereby corrected as shown below:

Col. 9, line 58, "r" should be --$\underline{r}$--

Col. 10, line 9, "r" should be --$\underline{r}$--

Col. 11, line 8, "v" should be --V--
(Spec., page 19, line 1)

Col. 12, line 20, "<" should be --$\leq$--

Col. 12, line 23, "<" should be --$\leq$--

Col. 12, line 38, "L(r/R)/L/" should be --L(r/R)/$\overline{L}$--

Col. 12, line 48, "L(r/R)/L/" should be --L(r/R)/$\overline{L}$--
(Spec., page 22, line 1)

Col. 12, line 60, "v" should be --$\Lambda$--

Col. 13, line 13, "v" should be --$\Lambda$--

Col. 13, between lines 30 and 36 (at the far left-hand side of the equation), "Y" should be --$\overline{Y}$--

UNITED STATES PATENT AND TRADEMARK OFFICE
CERTIFICATE OF CORRECTION

PATENT NO. : 5,332,362

DATED : July 26, 1994

INVENTOR(S) : FRANCOIS V. TOULMAY ET AL.

It is certified that error appears in the above-identified patent and that said Letters Patent is hereby corrected as shown below:

Col. 13, line 35, (at bottom right-hand side of the equation), "L" should be --$\overline{L}$--

Col. 13, line 49, "aerodynamic-" should be --aerodynamic--

Col. 13, line 63, "park" should be --part--

Col. 14, line 53, " $\theta I$ " " should be --$\theta I'$--

Col. 15, the equations between lines 5 & 10, the second line of each of equations A, B, C, & D, "L/L" should be --L/$\overline{L}$--

Col. 15, line 15, "L(r/R)/L/" should be --L(r/R)/$\overline{L}$--
(Spec., page 26, line 21)

Col. 15, the equations between lines 21 & 28, the second line of each of equations E, F, G, & H. "L/L" should be --L/$\overline{L}$--

Col. 15, line 33, "L(r/R)/L/" should be --L(r/R)/$\overline{L}$--

Col. 15, delete lines 37 and 38, insert the following:
--lower limit A'B'C'D', such that the coordinates of the points A', B', C' and D' are as follows:--

Col. 15, line 51, "Y'f(r/R)R" should be --Y'f(r/R)/R--

UNITED STATES PATENT AND TRADEMARK OFFICE
CERTIFICATE OF CORRECTION

PATENT NO. : 5,332,362

DATED : July 26, 1994

INVENTOR(S) : FRANCOIS V. TOULMAY ET AL.

It is certified that error appears in the above-identified patent and that said Letters Patent is hereby corrected as shown below:

Col. 16, line 24, "limits" should be --limit--

Col. 16, line 44, "its-tip" should be --its tip--

Col. 17, line 5, "r" should be --$\underline{r}$--

Col. 17, line 14, "875" should be --87%--

Col. 17, lines 54 & 54, equations A, B, C, D, second line of each, "L/L" should be --L/$\overline{L}$--

Col. 17, line 63, "L(r/R)/L/" should be --L(r/R)/$\overline{L}$--

Col. 18, lines 4 & 8, equations E, F, G, H, second line of each, "L/L" should be --L/$\overline{L}$--

Col. 18, line 13, "L(r/R)/L/" should be --L(r/R)/$\overline{L}$--

Col. 18, line 36, "with x" should be -- with x = --

Col. 18, line 55, "with x" should be -- with x = --

UNITED STATES PATENT AND TRADEMARK OFFICE
CERTIFICATE OF CORRECTION

PATENT NO. : 5,332,362

DATED : July 26, 1994

INVENTOR(S) : FRANCOIS V. TOULMAY ET AL.

It is certified that error appears in the above-identified patent and that said Letters Patent is hereby corrected as shown below:

Col. 19, line 60, "L(r/R)/L/" should be --L(r/R)/$\overline{L}$--

Col. 20, line 1, "L(r/R)/L/" should be --L(r/R)/$\overline{L}$--

Col. 20, line 6, before "(R-R3)" insert --/(R-R3)--

Col. 20, line 60, after "Y2=0.003244" insert an --R--

Signed and Sealed this

Eighth Day of November, 1994

Attest:

BRUCE LEHMAN

Attesting Officer

Commissioner of Patents and Trademarks